United States Patent
Dintenfass et al.

(10) Patent No.: US 12,014,224 B2
(45) Date of Patent: Jun. 18, 2024

(54) SYSTEM AND METHOD FOR PROCESSING OF EVENT DATA REAL TIME IN AN ELECTRONIC COMMUNICATION VIA AN ARTIFICIAL INTELLIGENCE ENGINE

(71) Applicant: BANK OF AMERICA CORPORATION, Charlotte, NC (US)

(72) Inventors: Katherine Kei-Zen Dintenfass, Lincoln, RI (US); Christine D. Black, Brooksville, ME (US); Jinna Zevulun Kim, Charlotte, NC (US); Andrea Robinette, Hockessin, DE (US); Jo-Ann Taylor, Godalming (GB); Vijaya L. Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 87 days.

(21) Appl. No.: 17/899,749

(22) Filed: Aug. 31, 2022

(65) Prior Publication Data
US 2024/0069987 A1   Feb. 29, 2024

(51) Int. Cl.
*G06F 9/54* (2006.01)
*G06F 9/38* (2018.01)
*G06F 9/50* (2006.01)

(52) U.S. Cl.
CPC ............ *G06F 9/542* (2013.01); *G06F 9/3836* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 6,263,051 B1 | 7/2001 | Saylor et al. |
| 7,076,032 B1 | 7/2006 | Pirasteh et al. |
| 7,627,475 B2 | 12/2009 | Petrushin |
| 8,014,496 B2 | 9/2011 | Schultz |
| 8,295,468 B2 | 10/2012 | Jaiswal et al. |
| 9,300,790 B2 | 3/2016 | Gainsboro et al. |
| 9,729,717 B1 | 8/2017 | Pettay et al. |
| 9,858,573 B2 | 1/2018 | Tew et al. |
| 10,044,860 B2 | 8/2018 | Odinak et al. |
| 10,402,826 B2 | 9/2019 | Tew et al. |
| 10,453,447 B2 | 10/2019 | Schmidt et al. |
| 10,667,155 B2 | 5/2020 | Ouyang et al. |
| 11,050,885 B1 | 6/2021 | Yannam et al. |

(Continued)

*Primary Examiner* — Craig C Dorais
(74) *Attorney, Agent, or Firm* — Moore & Van Allen PLLC; Andrew T. Wood

(57) ABSTRACT

Systems, computer program products, and methods are described herein for processing of event data real time in an electronic communication via an artificial intelligence engine. The present invention is configured to electronically receive an electronic communication from a user to an entity, identify event data associated with the user, identify an inflection level and a language attribution level from the electronic communication by processing the electronic communication with an input recognition engine, form a categorization level by categorizing the electronic communication comprising the inflection level and the language attribution level using an artificial intelligence engine, and route the electronic communication to a designated group containing users associated with the entity and/or an artificial intelligence-based dialogue resolution.

17 Claims, 5 Drawing Sheets

(56) References Cited

U.S. PATENT DOCUMENTS

| | | |
|---|---|---|
| 2010/0061534 A1 | 3/2010 | Wang et al. |
| 2020/0333875 A1* | 10/2020 | Bansal .................. G06F 9/3836 |
| 2021/0359872 A1* | 11/2021 | Deole .................. H04R 29/004 |
| 2022/0229861 A1 | 7/2022 | Copeland |
| 2022/0377174 A1 | 11/2022 | Dwyer et al. |

* cited by examiner

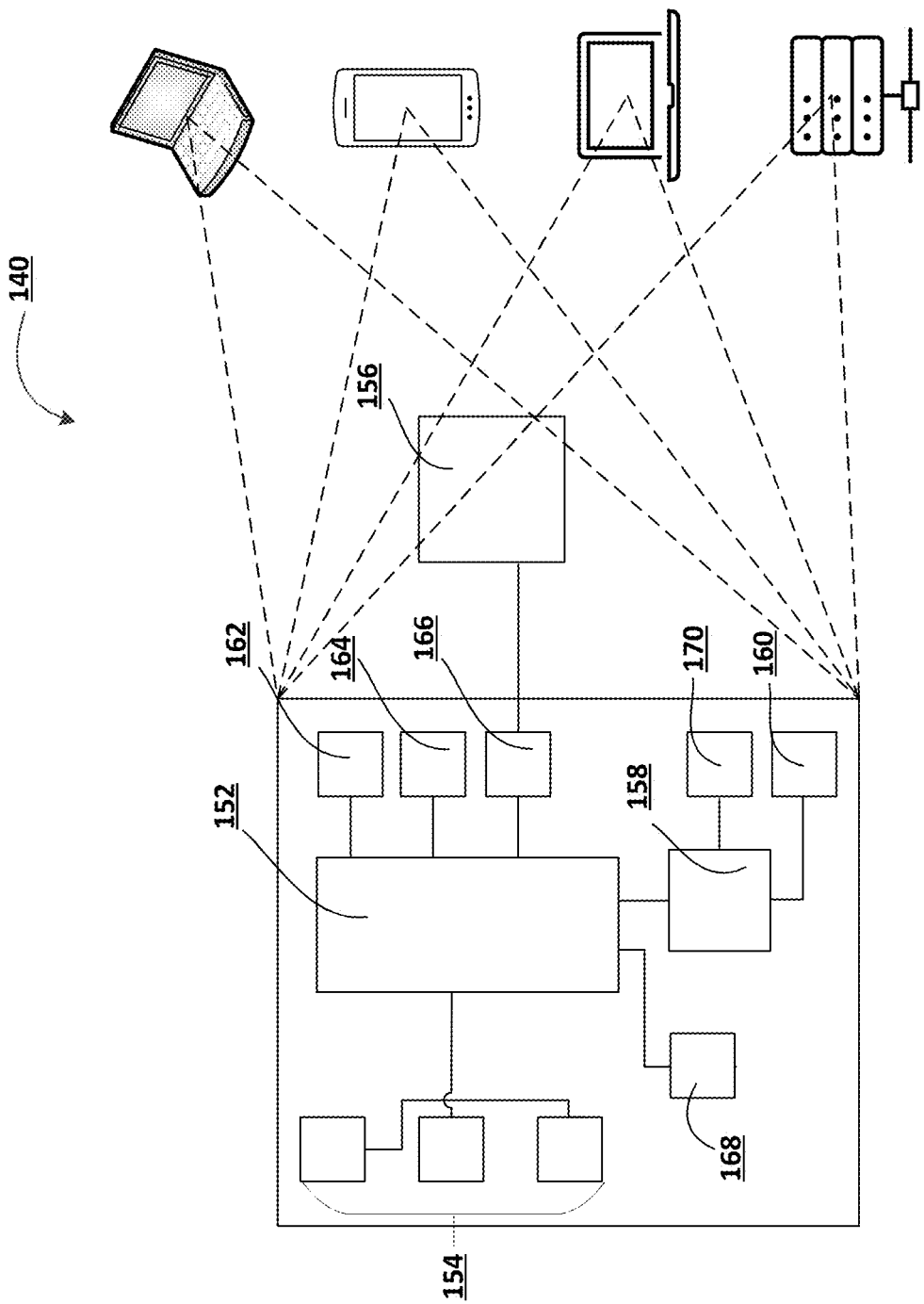

SYSTEM AND METHOD FOR PROCESSING OF EVENT DATA REAL TIME IN AN ELECTRONIC COMMUNICATION VIA AN ARTIFICIAL INTELLIGENCE ENGINE

FIELD OF THE INVENTION

The present invention embraces a system for processing of event data real time in an electronic communication via an artificial intelligence engine.

BACKGROUND

Currently, entities may use one of several available electronic communication processing systems to facilitate electronic communication between two or more parties. However, such processing systems are agnostic to the user, and merely take into account a timestamp at which a user engages in the electronic communication to redirect, queue, or otherwise engage with a user associated with the entity. As a result, the needs of the users who are engaging in the electronic communication are unmet and thus resulting in frustration, impatience, and overall less satisfaction. As such, there is a need for a system and method for processing of event data real time in an electronic communication via an artificial intelligence engine.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for processing of event data real time in an electronic communication via an artificial intelligence engine, the invention comprising electronically receiving an electronic communication from a user to an entity, identifying event data associated with the user, the event data at least one selected from the group consisting of: an electronic communication location, one or more environmental factors, a time, and one or more contributory events, identifying an inflection level and a language attribution level from the electronic communication by processing the electronic communication with an input recognition engine, forming a categorization level by categorizing the electronic communication comprising the inflection level and the language attribution level using an artificial intelligence engine, and routing the electronic communication to a designated group.

In some embodiments, the system, computer program product, or the method may include analyzing the categorization level over a duration of the electronic communication using the artificial intelligence engine, dynamically adjusting a queue position of the user based on an output of the artificial intelligence engine, wherein the output comprises a new categorization level based on an analysis of the categorization level over the duration of the electronic communication, and transmitting a de-escalation protocol to a user associated with the designated group.

In some embodiments, the input recognition engine is further configured to calculate the inflection level by determining the maximum inflection of the electronic communication, and categorize a severity of the inflection level based on a frequency of the maximum inflection into an inflection categorization.

In some embodiments, the input recognition engine is further configured to measure an audio volume change of the electronic communication, and categorize a severity of the audio volume change into an audio volume change categorization.

In some embodiments, the designated group comprises users associated with the entity.

In some embodiments, the designated group comprises an artificial intelligence-based dialogue resolution.

In some embodiments, the artificial intelligence engine assigns the categorization level to the designated group by receiving resolution satisfaction data from prior interactions and historic data between the user and the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
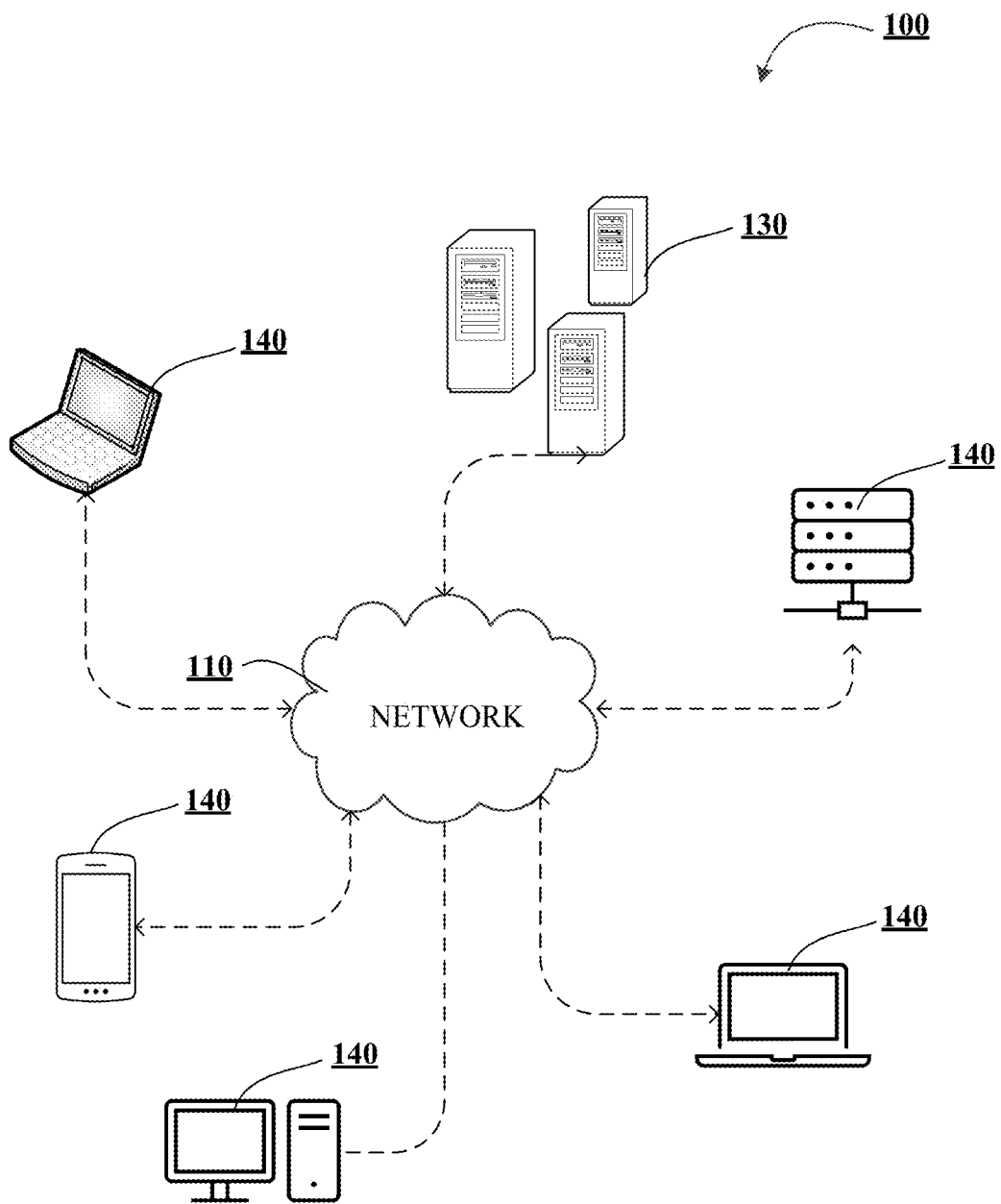
Figure 1B:
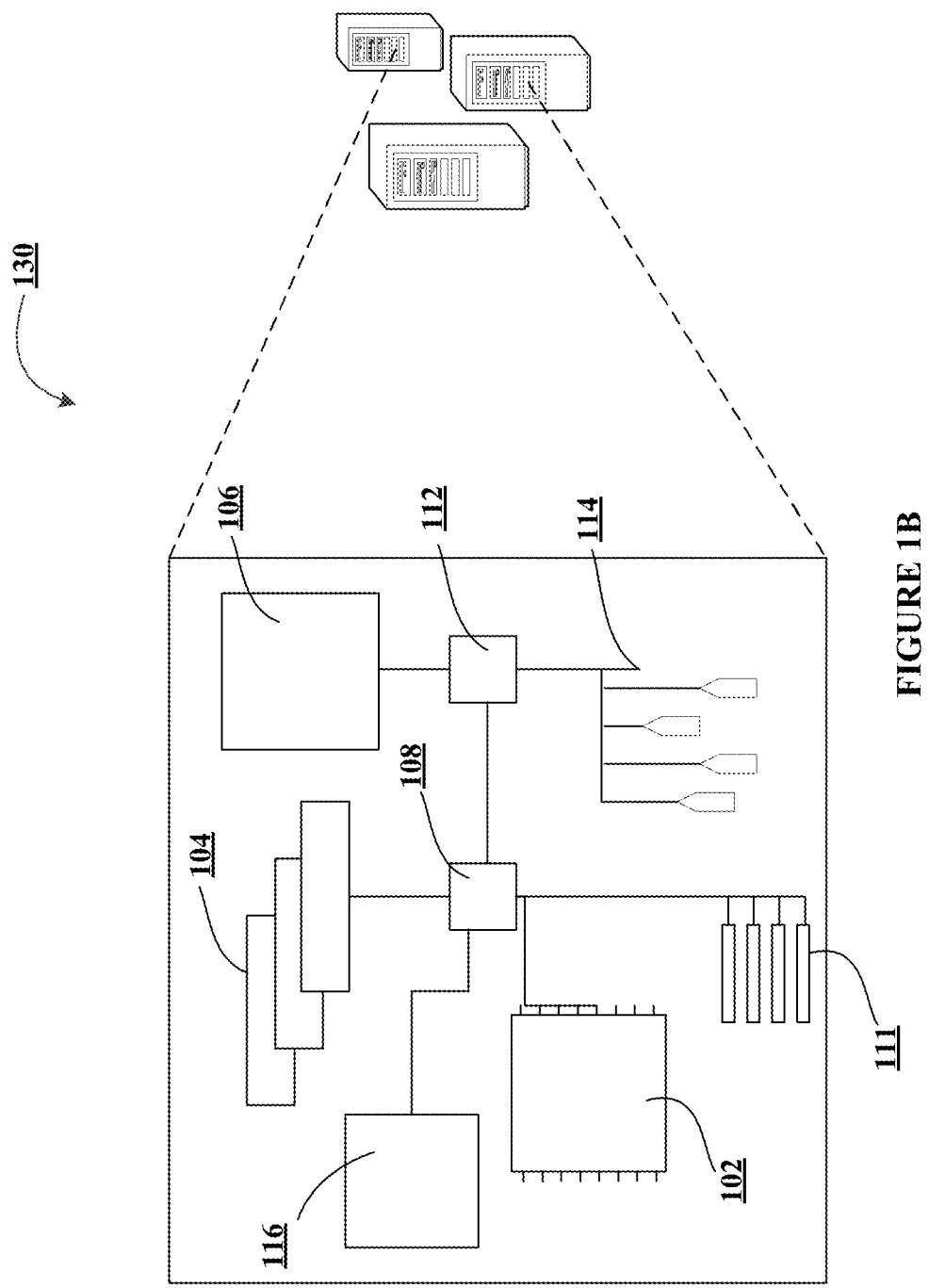
Figure 2:
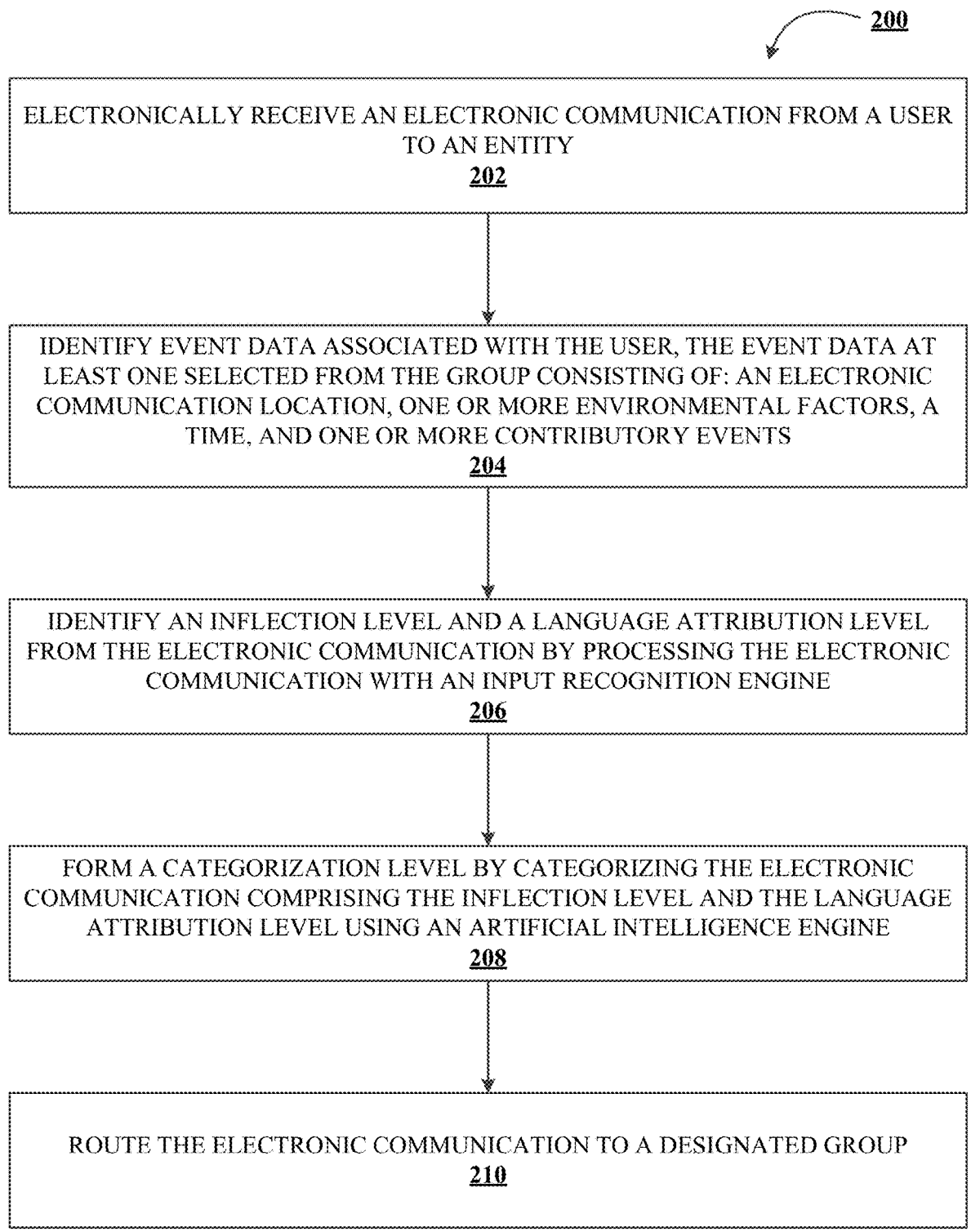
Figure 3:
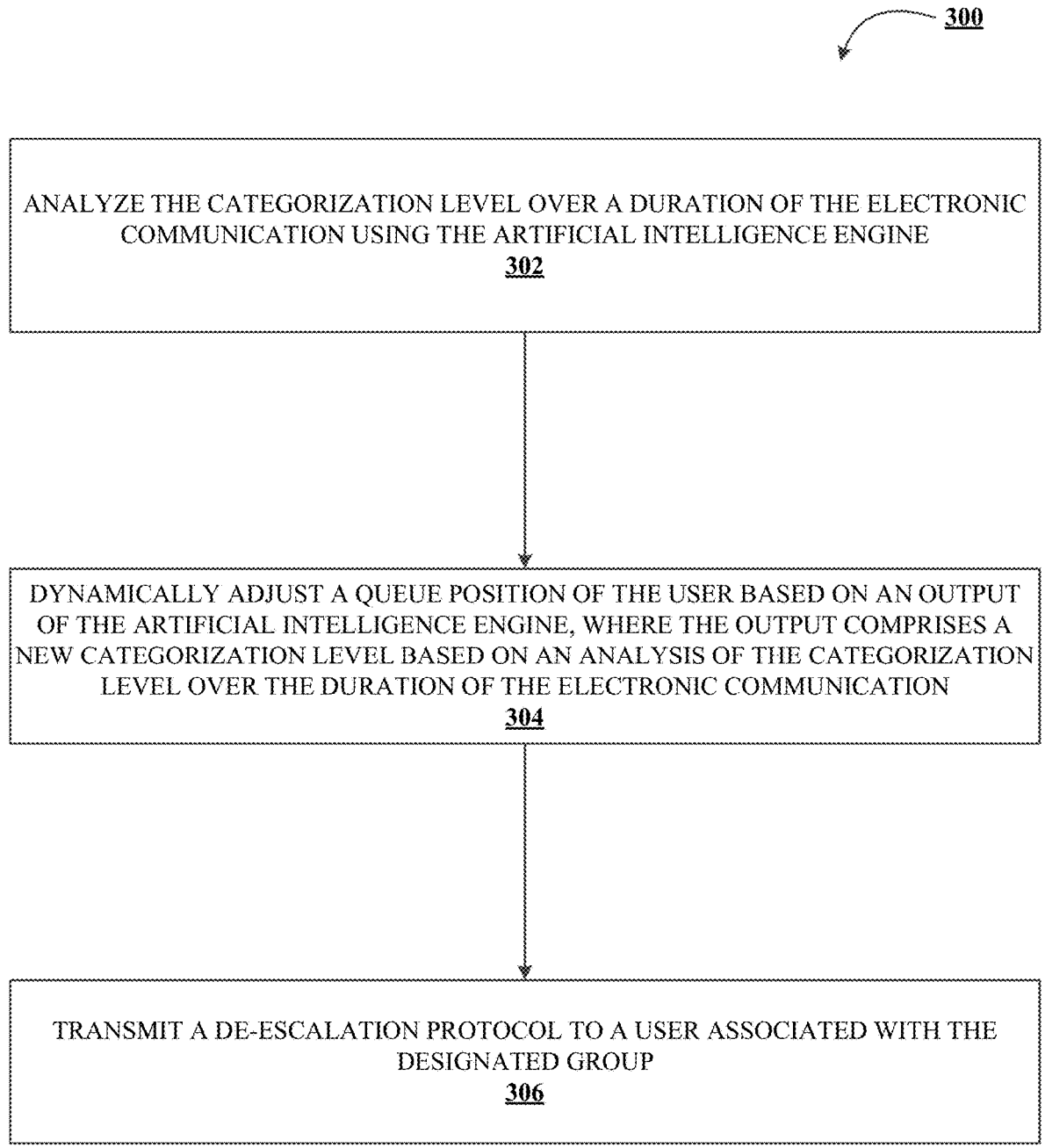

Having thus described embodiments of the invention in general terms, reference will now be made the accompanying drawings, wherein:

FIGS. 1A-1C illustrates technical components of an exemplary distributed computing environment for processing of event data real time in an electronic communication via an artificial intelligence engine, in accordance with an embodiment of the invention;

FIG. 2 illustrates a process flow for processing of event data real time in an electronic communication via an artificial intelligence engine, in accordance with an embodiment of the invention; and FIG. 3 illustrates a process flow for processing of event data real time in an electronic communication via an artificial intelligence engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data, such as communication data. Typically, these data can be related to the people who work for the organization, its products or services, the customers or any other aspect of the operations of the organization, such as communicative interactions between customers and people who work for the organization. As such, the entity may be any institution, group, association, financial institution, establishment, company, union, authority or the like, employing information technology resources for processing large amounts of data.

As described herein, a "user" may be an individual associated with an entity, or it may be a customer with a transactional relationship with the entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically coupled and/or in fluid communication with one another.

As used herein, an "electronic communication" may refer to any digital, analog, P2P, telephonic, text message ("SMS"), digital chat via GUI, or other interaction between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "event data" may refer to any number of real-world factors which contribute to the overall mindset, attitude, emotion, or peace-of-mind of a user. For example, event data may be collected by the system which takes into consideration the time of day, the location of a user (via geo-location), the local climate or weather of a user's location, the number of electronic communications between a user and an entity, the outcome of previous interactions, and so forth. This event data is stored in one or more memory devices of the system and analyzed by the artificial intelligence engine, the input recognition engine, or a user associated with the entity.

As used herein, a "artificial intelligence engine" may refer to any software or software-implemented method which is configured to train, build, and deploy prediction models, classification models, algorithms, and/or machine learning operations ("MLOps"). In other words an artificial intelligence engine uses training data to build a model in order to make predictions. Artificial intelligence engines may use supervised learning, unsupervised learning, semi-supervised learning, reinforcement learning, dimensionality reduction, or any other number of approaches to compute rules which match and optimize inputs to outputs. As used herein, the artificial intelligence engine may be used to predictively categorize an electronic communication, in real time, and subsequently route the electronic communication to a designated group for proper disposition with the artificial intelligence engine optimizing the user outcome and/or satisfaction based on historical data.

As used herein, "input recognition engine" may be any computer code or application executed in real time during an electronic communication to analyze the language (either spoken, typed, or otherwise communicated). In some embodiments, the input recognition engine may be a voice recognition engine structured to analyze spoken word by converting the spoken word to text prior to said analysis. In other embodiments, the input recognition may receive text. Portions of the input recognition engine may be configured to determine, via artificial intelligence, the temperament of one or more users during the electronic communication by comparing the voice inflection (e.g., the overall changes in pitch, frequency, capitalization of text, or the like), the audio volume changes (e.g., the measured decibels or clipping/distortion/audio compression caused by such audio volume changes), the words used (e.g., whether the chosen words are profane, curt, or associated with distress), or the like, by comparing the electronic communication with historical records of other electronic communications.

Prior to the invention described herein, entities may use one or more of the electronic communication routing tools available, however such electronic communication routing tools lack methods for routing users engaging in the electronic communication to proper users associated with the entity specifically equipped to handle user in various amounts or types of distress, emotions, or stress.

The invention disclosed herein provides a novel approach to using an artificial intelligence engine alongside an input recognition engine to evaluate the type of electronic communication, the event data associated with the user who is engaged in the electronic communication, and the communication patterns of said user to properly diagnose, route, and de-escalate the user in a manner which leaves the user with ultimate satisfaction.

Accordingly, in the present invention, the system electronically receives an electronic communication from a user to an entity, and the system identifies event data associated with the user. The event data identified may be an electronic communication location, one or more environmental factors, a time, and/or one or more contributory events. The input recognition engine identifies an inflection level and a language attribution level from the electronic communication by processing the electronic communication with an input recognition engine. An artificial intelligence engine then forms a categorization level by categorizing the electronic communication comprising the inflection level and the language attribution level. The electronic communication is then routed to a designated group. The artificial intelligence engine continues to analyze the categorization level over a duration of the electronic communication, and dynamically adjusts a queue position of the user. The artificial intelligence engine may determine a new categorization level based on an analysis of the categorization level over the duration of the electronic communication. Finally, a de-escalation protocol is transmitted to a user associated with the designated group What is more, the present invention provides a technical solution to a technical problem. As described herein, the technical problem includes inability for systems to uniquely de-escalate, route, or otherwise engage with users based on unique event data in real time. The technical solution presented herein allows for event data that is unique to a user interacting with an entity to be analyzed and taken into consideration when routing the electronic communication to a designated group. Further, the electronic communication itself is evaluated on a real-time basis to better serve the user. In particular, artificial intelligence and input recognition engines to determine the queue, routing, de-escalation tactics, and other characteristics of the electronic communication is an improvement over existing solutions inability to satisfy users during electronic communications, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment for processing of event data real time in an electronic communication via an artificial intelligence engine 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for processing of event data real time in an electronic communication via an artificial intelligence engine, in accordance with an embodiment of the invention. The process begins at block 202 where the system electronically receives an electronic communication from a user to an entity. It shall be appreciated that electronic communication between a user and an entity may take numerous forms, such as through phone calls, either Voice-over-IP ("VoIP"), telephonic, or other digital communication techniques which capture voice through a microphone and transmits the voice to the entity (and vice versa) through a digital or analog signal. Moreover, electronic communications may be non-voice electronic communications such as internet chat, e-mail, text message ("SMS"), social media text via internet publication, or the like.

The system described herein processes such electronic communications in real time, such that when a user transmits, such as speaking, typing, or sending and electronic communication, the system receives the electronic communication, either instantaneously, or under realistic delay conditions, such as within a few milliseconds, seconds, or minutes of the transmission from the user.

The user may be initiating (or in some embodiments, receiving) the electronic communication with the entity to seek a disposition of a challenge that the user has with their account or service with the entity. As one non-limiting example which will be expanded upon throughout this disclosure, a user who is traveling via a carrier operated by the entity may experience a delay in the service of the carrier, and as such the user may initiate an electronic communication with the entity to have their travel plans altered to better accommodate the user and their own personal itinerary. As such the user may experience some frustration with the entity for the alteration of their original travel plans. In doing so, the system described herein is ideal for maximizing the user's satisfaction in their electronic communication with the entity, since their frustration at the time of the electronic communication may place a strain on the relationship between the user and the entity.

The process continues in block 204, where the system identifies event data associated with the user, the event data at least one selected from the group consisting of: an electronic communication location, one or more environmental factors, a time, and one or more contributory events. Since the user engaging in the electronic communication is subjected to many factors which may alter or change their attitude, outlook, and general mood during and before the electronic communication, the system's benefit is maximized by identifying one or more factors which may contribute to these emotional characteristics.

The system may take into consideration the electronic communication location, which represents the actual physical location of the user. This information may be gathered by using global positioning system ("GPS") information provided by the user device of the user. The GPS information may be provided through an application installed on the user device structured to track the user's location and transmit this information to the entity. Alternatively, the electronic communication information may be provided by triangulation using cellular communication towers, or in some embodiments by locating the internet protocol ("IP") address of the user, or of the internet network on which the user is connected to, when in electronic communication with the entity. In yet additional embodiments, the user may provide their current location to the entity via verbal or text-based electronic communication when prompted by the entity for such information.

The system may also take into consideration one or more environmental factors, such as current weather data, weather patterns, precipitation, storm locations, or the like. The environmental factors are typically determined based on the electronic communication location combined with various weather-related databases. Other environmental factors may also be considered, such as traffic or pedestrian data (to identify areas where there is traffic congestion to which the user is subjected, or areas of high pedestrian traffic). Any of these environmental factors may contribute to the user's frustration level, and thus aid in the system determining the appropriate designated group to which the user is routed during the electronic communication.

The system may take into consideration a time, such that the time of day, time of year, or the like, are considered. For example, an electronic communication initiated during the middle of the night (e.g., 2:00 AM) may indicate to the system that the user is under more stress than one which is received during the day (e.g., 2:00 PM).

The system may take into consideration one or more contributory events. Contributory events may be any real-world event which impacts a user, such as a cancelled flight on a carrier operated by the entity. Other examples of contributory events may be political transitions, widespread famine, supply shortages, death of one or more persons, job loss, recession, or the like. Any current event, no matter whether on a macro-level such as national contributory events, or on a personal level, such as a loss of a family member, may be considered by the system. The system may be structured to receive news data to determine relevant contributory events, and may parse or search the news data with keywords determined by the system to be relevant to the user, such searching for the keywords associated with a user's geographic location, travel information (including but not limited to the destination and departure locations), biographic information such as name, or the like.

Next, the process continues in block 206, where the system identifies an inflection level and a language attribution level from the electronic communication by processing the electronic communication with an input recognition engine. In order to better characterize the nature of the electronic communication and the characteristics of the user who engages in the electronic communication, an input recognition engine is utilized to recognize and classify or categorize either spoken word or text communication. If spoken word is vocalized in the electronic communication, the input recognition engine may first recognize speech and translate it into text for ideal processing by the input recognition engine.

It shall be understood that when users are under stress, the inflection level is able to be detected and characterized. For example, when a user is under pressure or stressed, the inflection of a user's voice may be such that it alternates between a calm, monotone structure (e.g., at a relatively constant pitch) to a structure of varying speeds and pitches. Alternatively, an electronic communication comprising text instead of speech can similarly be characterized, typically by evaluating the presence of words in "caps lock" (e.g., all capital letters), and by judging the frequency of the electronic communication (e.g., a concise text paragraph compared to a stream of short messages transmitted back-to-back).

In some embodiments, the input recognition engine may be configured to calculate the inflection level by determining the maximum inflection of the electronic communication. For example, the input recognition level may take an average (e.g., a "baseline") inflection level of a user and compare the inflection level of a maximum inflection level determined during an electronic communication. The maximum inflection level can be calculated based on the difference between the average and the highest-measured inflection levels (e.g., the highest shift in vocal pitch or the highest shift in the number of capitalized letters in words).

The system may also be structured to categorize a severity of the inflection level based on a frequency of the maximum inflection into an inflection categorization. In processing of the input(s), the input recognition engine may use a repository of historical categorization of input(s) to train itself via artificial intelligence to better categorize new input(s) into various inflection categorization categories. Non-limiting examples of such categories may include: high urgency, medium, low urgency, or the like. In this way, the system can utilize the inflection categorization in conjunction with a categorization made by an artificial intelligence engine described in later steps such as the volume change categorization to better route the electronic communication to the appropriate designated group.

In some embodiments, the input recognition engine is configured to measure an audio volume change of the electronic communication and categorize a severity of the audio volume change into an audio volume change categorization. For spoken word, it is known that users under stress may speak with a louder voice than during times which the users are not under stress. Accordingly, the system may measure using a decibel meter the sound pressure level of the electronic communication in order to calculate, via subtraction between the average sound pressure level and the maximum sound pressure level, the audio volume change of the electronic communication. Further, and similarly to the method by which the system categorizes a severity of the inflection level, the input recognition engine may use a repository of historical categorization of input(s) to train itself via artificial intelligence to better categorize new input(s) into various audio volume change categories. Non-limiting examples of such categories may include: high urgency, medium, low urgency, or the like. Likewise, the system can utilize the categorization in conjunction with a categorization made by an artificial intelligence engine described in later steps to better route the electronic communication to the appropriate designated group.

It shall be appreciated that the configuration of the artificial intelligence engine which utilizes the volume change categorization and/or inflection categorization may be advantageous such that the system can assign relative weights to the volume change categorization and/or inflection categorization to better predict and properly route the user to the designated group. For example, in a noisy environment such as an airport terminal, the volume change categorization may be less relevant than the inflection categorization since all volumes transmitted to the entity are "loud." Accordingly, the system takes this information into account, along with the location of the user, to assign appropriate weights to one or more of these factors.

The system in block 206 also determines the language attribution level, by characterizing the vocabulary used by the user in the electronic communication. This may be done by recognizing certain aggressive or profane words or phrases and marking the electronic communication on a scale, such as 1-5, 1 being the most peaceful and 5 being the most aggressive. Other scales are contemplated, such as 1-10, 1-100, or in some embodiments there may be named categories for the language attribution level such as "unpleasant," "urgent," "peaceful," or the like.

The process then continues in block 208, where the system forms a categorization level by categorizing the electronic communication comprising the inflection level and the language attribution level using an artificial intelligence engine. Since the system may now have determined at least the inflection level and the language attribution level, the system utilizes an artificial intelligence engine to categorize the nature and priority of the electronic communication. In some embodiments, the artificial intelligence engine is structured to electronically receive, as inputs, an inflection categorization and audio volume change categorization.

Once an electronic communication is initiated between a user and the entity, the user may wish to escalate the electronic communication to a person of authority, or perhaps to a select group of users associated with the entity to solve the problems faced by the user. Similarly, the entity may wish to maintain a relationship with the user, and as such the entity may prioritize the satisfaction level of the user during the electronic communication. In any of these scenarios, the electronic communication benefits from being routed to the appropriate group of users associated with the entity to handle the electronic communication and offer the best disposition to accommodate the user's needs.

A number of pre-determined categorization levels may be specified by the entity for categorization of the electronic communications by the artificial intelligence engine. As one non-limiting example, an entity may determine that one such categorization be customer retention related and designated for only the most severe electronic communications which have been determined to require a specialized user associated with the entity to interact with the user to avoid the user terminating their relationship with the entity altogether. Another such non-limiting example may be a dedicated categorization for problems with service provided by the entity to the user which can be remediated. Another such categorization may be dedicated to entity messaging which is likely to cause additional angst in the user, such as an increase in the cost of the entity's service which the entity will be unable to reduce.

It shall be appreciated that such categorization levels will be assigned by the artificial intelligence engine under the motive to eventually assign one or more categorization levels to corresponding "designated groups," as will be described fully with respect to block 210.

In some embodiments, the artificial intelligence engine may determine a categorization level using historic data as an input. While it is common for entities to capture feedback from users using surveys and other tactics (e.g., resolution satisfaction data), the invention described herein may implement a novel approach to using the results from such surveys to better train the artificial intelligence engine to properly categorize electronic communications into the appropriate categorization levels based on the feedback from these surveys. Accordingly, the artificial intelligence engine may assign the categorization level to the designated group by receiving resolution satisfaction data from prior interactions and historic data between the user and the entity.

Thereafter, the process continues in block 210 by routing the electronic communication to a designated group. A "designated group" as used herein may refer to a network of users associated with the entity (e.g., customer service representatives), or in some embodiments, additional artificial intelligence-based dialogues, the designated group designed to interact with the user and provide a resolution to the challenges faced by the user.

For designated groups comprising artificial intelligence-based dialogues, it shall be understood that the designated group may provide users with resolutions to their inquiries in an autonomous way, such that no interaction with a user associated with the entity is required. This may be advantageous for users who contact the entity with low inflection and/or categorization levels, or for those users who present the entity with inquiries during the electronic communication that may be remedied in a simple manner by the entity.

Conversely, the designated group may comprise users associated with the entity or designated group. The categorization level may be assigned to the designated group by the artificial intelligence engine, or in some embodiments the designated group may be assigned to the categorization level by the artificial intelligence engine. The members of the designated group may have unique specialties, talents, or skillsets designed to de-escalate or better handle the customers under stress, and thereby create better outcomes with respect to the relationships between the users and the entity.

Similarly, members of each designated group may be specially trained to provide dispositions for specialized challenges.

Accordingly, users' electronic communications may be redirected (e.g., routed) from the digital location of the initial interaction to that of a designated group. In additional embodiments, after an electronic communication is routed to a designated group, one or more members (e.g., users associated with the entity) of the designated group may subsequently route the electronic communication to designated groups comprising artificial intelligence-based dialogues for further disposition. In yet additional embodiments, the electronic communication may first be routed to designated groups comprising artificial intelligence-based dialogues, and thereafter routed to a designated group with users associated with the entity.

FIG. 3 illustrates a process flow 300 for processing of event data real time in an electronic communication via an artificial intelligence engine. It shall be appreciated that the process flow 300 integrates within the process flow 200, such that process flow 300 describes several of the underlying computer program processes which may assist in the execution of the process flow 200. The process flow 300 begins at block 302, wherein the system analyzes the categorization level over a duration of the electronic communication using the artificial intelligence engine.

It shall be appreciated that electronic communications may be long in duration, and may span a plurality of designated groups prior to reaching a resolution for the user. In some embodiments of the invention, the artificial intelligence engine is configured to determine a categorization level at the onset of an electronic communication. However, in other embodiments, the system continuously makes this determination and validates whether the prediction from the artificial intelligence engine regarding the designated group at any given moment is still appropriate. For example, the determination of the categorization level may change after a customer is routed to a designated group and the categorization level increases, perhaps indicating that the match between the user and the designated group is not ideal for the user and initiating an inquiry for a better match through the artificial intelligence engine.

The process continues in block 304 where the system dynamically adjusts a queue position of the user based on an output of the artificial intelligence engine. It shall be appreciated that at any given point, an entity may be inundated with electronic communications which overwhelm the entity and require the entity to place a user into a queue before the entity is able to interact with the user. Some of these inundations are expected, such as during early morning hours on a Monday, while some of these inundations are unexpected, such as when there is a natural calamity, a series of widespread network outages or cancelled obligations from the entity, or the like. Accordingly, the queue length can vary drastically, requiring short waits by the user in some examples, to very long waits in others.

Depending on the categorization level of the electronic communication determined by the artificial intelligence engine, the queue position may be reduced in order to better assist the user. As such, the length of time in the queue will be shortened, lengthened, or otherwise adjusted in order to provide the user with the utmost satisfaction possible.

The system may be configured to consider a user's individual characteristics, known agitators, or personal preferences to direct personalized de-escalation media to the user during the queue, in order to better satisfy the user. For example, if the entity knows that a user is engaging in the electronic communication from a beach while on vacation, the entity may play beach-themed music for the user while the user waits in the queue. Similarly, if the user is engaging in the electronic communication as a result of an increase in the cost of the entity's service, this instance may be recognized by the artificial intelligence engine and direct the system to provide audio, visual, or other media to promote the benefits the entity's services relative to other entities which provide similar services.

The process then continues in block 306, wherein the system transmits a de-escalation protocol to a user associated with the designated group. As noted, each of the designated groups may have special skillsets related to handing the disposition of a user's needs. However, electronic communications may contain an array of scenarios, each very unique to the situation at hand. Moreover, certain designated groups may handle generic, non-specific requests by users, each of which cannot be properly identified before a user connects with a user associated with the entity, or there may not be a designated group to specifically address the user's needs.

Accordingly, the system may transmit a pre-configured de-escalation protocol such as a script, question and answer list (for commonly asked questions), or specific phrases or words to incorporate with the interaction with the user. This de-escalation protocol may be provided to a user associated with the entity prior to engaging with the user who initiated the electronic communication, or it may be provided simultaneously while the electronic communication begins with the designated group.

The artificial intelligence engine may also be structured to integrate transcripts of past electronic communications into the de-escalation protocol, since the artificial intelligence engine has been provided feedback of past electronic communications and their respective resolution satisfaction data. Accordingly, these transcripts may be synthesized and automatically provided to the user associated with the entity in the designated group prior or during their interaction with the user.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for processing of event data real time in an electronic communication via an artificial intelligence engine, the system comprising:
   at least one non-transitory storage device; and
   at least one processor coupled to the at least one non-transitory storage device, wherein the at least one processor is configured to:
   electronically receive an electronic communication from a user to an entity;
   identify event data associated with the user, the event data at least one selected from the group consisting of: an electronic communication location, one or more environmental factors, a time, and one or more contributory events;
   identify an inflection level and a language attribution level from the electronic communication by processing the electronic communication with an input recognition engine, wherein the input recognition engine is configured to calculate the inflection level by determining the maximum inflection of the electronic communication, and categorize a severity of the inflection level based on a frequency of the maximum inflection into an inflection categorization;
   form a categorization level by categorizing the electronic communication comprising the inflection level and the language attribution level using an artificial intelligence engine; and
   route the electronic communication to a designated group.

2. The system of claim 1, wherein the at least one processor is further configured to:
   analyze the categorization level over a duration of the electronic communication using the artificial intelligence engine;
   dynamically adjust a queue position of the user based on an output of the artificial intelligence engine, wherein the output comprises a new categorization level based on an analysis of the categorization level over the duration of the electronic communication; and
   transmit a de-escalation protocol to a user associated with the designated group.

3. The system of claim 1, wherein the input recognition engine is further configured to:
   measure an audio volume change of the electronic communication; and
   categorize a severity of the audio volume change into an audio volume change categorization.

4. The system of claim 1, wherein the designated group comprises users associated with the entity.

5. The system of claim 1, wherein the designated group comprises an artificial intelligence-based dialogue resolution.

6. The system of claim 5, wherein the artificial intelligence engine assigns the categorization level to the designated group by receiving resolution satisfaction data from prior interactions and historic data between the user and the entity.

7. A computer program product for processing of event data real time in an electronic communication via an artificial intelligence engine, the computer program product comprising a non-transitory computer-readable medium comprising code causing an apparatus to:
electronically receive an electronic communication from a user to an entity;
identify event data associated with the user, the event data at least one selected from the group consisting of: an electronic communication location, one or more environmental factors, a time, and one or more contributory events;
identify an inflection level and a language attribution level from the electronic communication by processing the electronic communication with an input recognition engine, wherein the input recognition engine is configured to calculate the inflection level by determining the maximum inflection of the electronic communication, and categorize a severity of the inflection level based on a frequency of the maximum inflection into an inflection categorization;
form a categorization level by categorizing the electronic communication comprising the inflection level and the language attribution level using an artificial intelligence engine; and
route the electronic communication to a designated group.

8. The computer program product of claim 7, wherein the non-transitory computer-readable medium comprising code further causes an apparatus to:
analyze the categorization level over a duration of the electronic communication using the artificial intelligence engine;
dynamically adjust a queue position of the user based on an output of the artificial intelligence engine, wherein the output comprises a new categorization level based on an analysis of the categorization level over the duration of the electronic communication; and
transmit a de-escalation protocol to a user associated with the designated group.

9. The computer program product of claim 7, wherein the input recognition engine is further configured to:
measure an audio volume change of the electronic communication; and
categorize a severity of the audio volume change into an audio volume change categorization.

10. The computer program product of claim 7, wherein the designated group comprises users associated with the entity.

11. The computer program product of claim 7, wherein the designated group comprises an artificial intelligence-based dialogue resolution.

12. The computer program product of claim 11, wherein the artificial intelligence engine assigns the categorization level to the designated group by receiving resolution satisfaction data from prior interactions and historic data between the user and the entity.

13. A method for processing of event data real time in an electronic communication via an artificial intelligence engine, the method comprising:
electronically receiving an electronic communication from a user to an entity;
identifying event data associated with the user, the event data at least one selected from the group consisting of: an electronic communication location, one or more environmental factors, a time, and one or more contributory events;
identifying an inflection level and a language attribution level from the electronic communication by processing the electronic communication with an input recognition engine, wherein the input recognition engine is configured to calculate the inflection level by determining the maximum inflection of the electronic communication, and categorize a severity of the inflection level based on a frequency of the maximum inflection into an inflection categorization;
forming a categorization level by categorizing the electronic communication comprising the inflection level and the language attribution level using an artificial intelligence engine; and
routing the electronic communication to a designated group.

14. The method of claim 13, the method further comprising:
analyzing the categorization level over a duration of the electronic communication using the artificial intelligence engine;
dynamically adjusting a queue position of the user based on an output of the artificial intelligence engine, wherein the output comprises a new categorization level based on an analysis of the categorization level over the duration of the electronic communication; and
transmitting a de-escalation protocol to a user associated with the designated group.

15. The method of claim 13, wherein the input recognition engine is further configured to:
measure an audio volume change of the electronic communication; and
categorize a severity of the audio volume change into an audio volume change categorization.

16. The method of claim 13, wherein the designated group comprises users associated with the entity.

17. The method of claim 13, wherein the designated group comprises an artificial intelligence-based dialogue resolution.

* * * * *